United States Patent [19]

Voln et al.

[11] Patent Number: 4,901,583
[45] Date of Patent: Feb. 20, 1990

[54] ELECTROMAGNETIC PICK-UP DEVICE FOR MEASURING VOLUME FLOWS OF THICK, HIGHLY ABRASIVE SUSPENSIONS

[75] Inventors: Miroslav Voln , Baska; Ivo Tomás, Ostrava; Antonín Sûchop, Brno, all of Czechoslovakia

[73] Assignee: Vedeckový zkumý uhelný ústav, Ostrava-Radvanice, Czechoslovakia

[21] Appl. No.: 277,769

[22] Filed: Nov. 30, 1988

[30] Foreign Application Priority Data

Nov. 30, 1987 [CS] Czechoslovakia ............... 8674-87

[51] Int. Cl.$^4$ .............................................. G01F 1/58
[52] U.S. Cl. .................................................. 73/861.12
[58] Field of Search ..................................... 73/861.12

[56] References Cited

FOREIGN PATENT DOCUMENTS 3340103 5/1985 Fed. Rep. of Germany ... 73/861.12
2068122 8/1981 United Kingdom ............. 73/861.12

*Primary Examiner*—Charles A. Ruehl
*Attorney, Agent, or Firm*—Notaro & Michalos

[57] ABSTRACT

An electromagnetic pick-up device measures volume throughflow of thickened, highly abrasive suspension using pick-up electrodes of electrically conductive material embedded in walls of a tube of electrically non-conductive material. Pairs of the electrodes are arranged in the wall of the tube so that the effective distance between them increases during the course of prolonged operation due to abrasion in a manner similar to the diameter of tube, at a rate capable of compensating for the effect of the increasing diameter of the tube due to abrasion.

2 Claims, 1 Drawing Sheet 4,901,583

ELECTROMAGNETIC PICK-UP DEVICE FOR MEASURING VOLUME FLOWS OF THICK, HIGHLY ABRASIVE SUSPENSIONS

FIELD OF THE INVENTION

The invention relates to an electromagnetic pick-up device for measuring volume flows of thickened, highly abrasive suspensions, particularly of coal and gangue sediments, sand and cement suspensions and similar media, in all branches of industry and agriculture.

BACKGROUND OF THE INVENTION

Known constructions of electromagnetic pick-up devices of the kind mentioned above are arranged so that a measuring tube of non-magnetic steel is provided with a relatively thin layer of an electrically insulating lining made of different insulating materials, e.g., rubber, ceramic material, teflon and other plastics. The electrodes are made of different electrically conductive metals, e.g., stainless steel, tungsten, platinum, hastealloy and the like. Due to abrasion produced by the streaming thickened medium, the lining is significantly abraded, sometimes in the course of less than one year, so that particularly in the case of conduits of large diameters, there is a substantial difference in thickness as compared with the original results. Further, the lining is frequently completely abraded, so that the pick-up device becomes inoperative and unfit for use. Because the material of the electrode has a substantially higher resistance to abrasion than the material of the lining, the electrode remains after the abrasion thereof, and with respect to the portion exposed in the throughflow cross section, vortexes are created and the lining is attacked in the area behind the electrode. For horizontal conduits a sedimentation of solid particles is experienced in the course of passage of thickened liquids so that the rotationally symmetric profile is substantially affected, and the indication produced by the flow indicator is subject to substantial error. For solid particles of a size of 1 mm and of a specific weight of 1.5 kg/dm$^3$ this error is, for instance, up to 3% when using a pair of electrodes situated at the center of the throughflow cross section.

SUMMARY OF THE INVENTION

It is an object of this invention to eliminate or at least reduce the above mentioned drawbacks and to provide a device which continuously produces a correct indication of the flow. The electromagnetic pick-device for measuring the volume flow of thickened, highly abrasive suspensions according to this invention, comprises one or more pairs or couples of pick-up electrodes, made of electrically conductive materials and fixedly connected to, i.e., incorporated in, a lining of electrically non-conductive material, which are arranged such that the electrodes are situated at a distance of 0.3 to 0.8 of the beginning or original internal radius, $R_o$, of the lining or of a measuring tube or cylinder from a plane which is perpendicular to the direction of the exciting magnetic field, passing through the center of the lining or of the measuring tube, and have the shape of a curve the coordinates X, Y of which are related by the equation:

$$Y = (X \cdot R_o^2 \cdot X_o^{-1} - X^2)^{1/2};$$

wherein the coordinate of the first point of the curve $X_o$ complies with the relation:

$$X_o \leq \frac{R_o^2}{R}$$

where R is the external radius of the lining or of the measuring tube, or have the shape of a straight line passing along said curve. The material of the electrically non-conductive lining or of the measuring tube has the same resistance against abrasion as the electrically conductive material of the pick-up electrodes, or that resistance differs by a maximum of 3%.

The lining is made of electrically insulating material, for instance of rubber, with a high specific electrical resistance in a substantially thicker layer than the pick-up means. The electrodes are also made of rubber having the same resistivity against abrasion as the rubber of the lining, with, however, a high electrical conductivity. The position or location of the electrodes on the circumference of the measuring tube, and of the lining of the electromagnetic pick-up device, are determined by calculation so that the error in the measured value of the throughflow due to increase of the throughflow cross section caused by erosion or abrasion produced by the through-flowing medium, i.e., caused by the increase in the diameter of the pick-up device, is completely compensated for. As a result, the distance between the electrodes, and thus the signal voltage on the pick-up electrodes, is increased due to the abrasive effect of the throughflowing medium to a value corresponding to the proper value of the throughflow volume at the given moment.

In an exemplary embodiment of a pick-up device according to this invention, the pick-up device has a starting internal radius $R_o=200$ mm and the electrodes are situated at a distance of 0.718 $R_o$ from the center of the measuring tube or cylinder of the pick-up device. In the case of a classical or conventional arrangement wherein after prolonged operation the internal diameter of the tube has increased by 2%, there is an error in the magnitude of the volume throughflow of 3.8% as measured against the calibrated value. In contrast, in the case of the arrangement according to the present invention this error is only 0.05%. Further, in a case where there is an increase in the internal diameter of 5%, the error is 9.5% for the classical arrangement and only 0.16% for the arrangement according to this invention.

In a situation wherein the electromagnetic pick-up devices are disposed in another than vertical positions, the rotationally symmetric profile of the throughflow cross section is very highly affected by liquids with a high content of solid particles, and the speed of sedimentation particles, in the lower half of the throughflow cross section is substantially lower than in the center and in the upper half. The classical or conventional pick-up arrangement using two electrodes is, under this circumstance, subject to an error up to 3%. An arrangement with two pairs or couples of electrodes in the upper and lower half of the throughflow cross section according to this invention and arranged so that the connection lines of the upper and lower couple are horizontal provides, through electronic adding of both signals, a measurement which is substantially more accurate. Further, the pick-up device has a substantially longer lifetime than in the classical arrangement in which the pick-up electrodes are situated in the center of the measuring tube.

The construction, in accordance with the invention, of a thick-walled electrically insulating lining with electromagnetic pick-up devices with electrodes made from electrically conductive material having the same resistance against abrasion as the lining, and situated according to calculations so that the error due to the increase of the throughflow cross section is compensated for, has the additional advantage that the electromagnetic pick-up device has a lifetime several times longer than known pick-up devices. The measuring device is substantially more accurate over a certain time period of application, the time interval for a required calibration being substantially longer. Because the lining and the electrodes are made for instance of vulcanized rubber, the absolute tightness of electrodes with respect to the lining is assured even where there are substantial changes in temperature and also over the course of ageing. The construction of the pick-up device of the invention as applied to horizontal conduit networks enables an accurate measurement of even heavily thickened and non-Newtonian liquids.

BRIEF DESCRIPTION OF THE DRAWINGS

The single figure is a diagrammatic view of an electrode pair showing the shape and orientation thereof.

DESCRIPTION OF A PREFERRED EMBODIMENT

Figure 1:
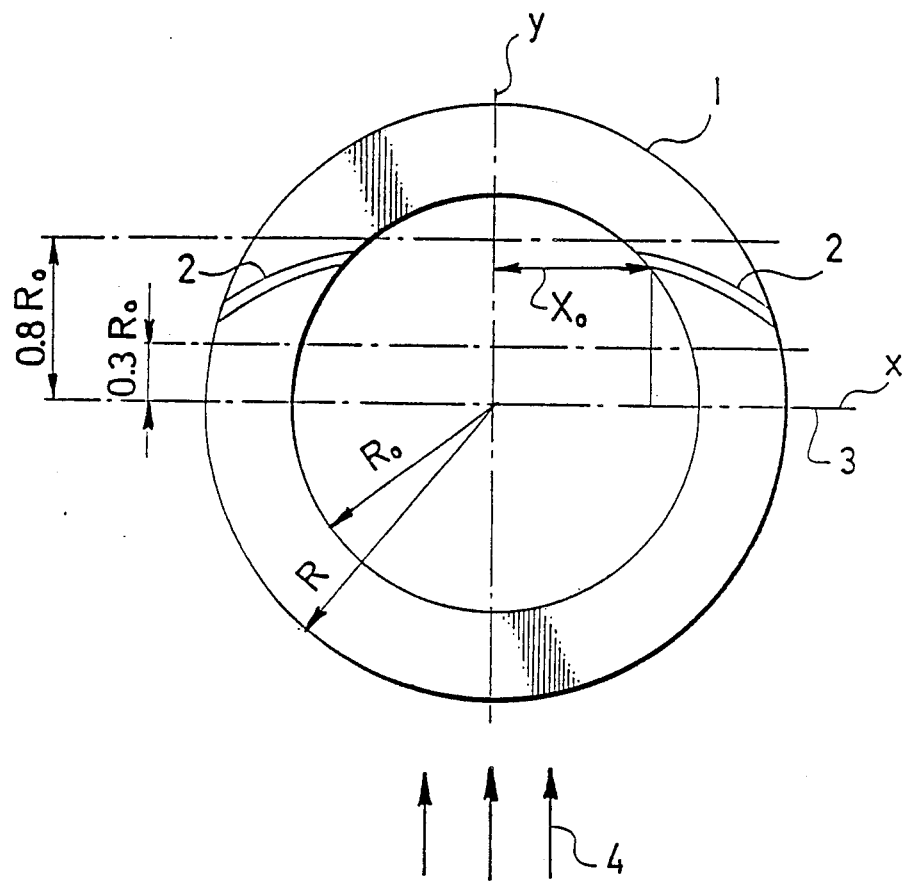

Referring to the single figure of the drawings, two pick-up electrodes 2 are shown which are located on the circumference of a lining or of a measuring tube, denoted 1, the showing in the drawings being a view taken through a plane perpendicular to the flowing liquid.

The pick-up electrodes 2 are situated at a distance from 0.3 to 0.8 of the original or starting internal radius $R_o$ of the lining or of measuring tube or cylinder wherein the radius lies in a plane 3 passing through the center of the measuring tube 1, which plane 3 is perpendicular to the direction of an exciting magnetic field indicated at 4.

The radius $R_o$ is, as stated, the initial internal radius of the lining or of the measuring tube or imaginary cylinder 1 at the start of measurements whereas the radius R is the external radius of the lining or of the measuring tube or cylinder 1 after abrasion encountered during the course of the measurement period. The pick-up electrodes 2 have the shape of a curve, the coordinates X, Y of which are determined by the equation:

$$Y = (X \cdot R_o^2 \cdot X_o^{-1} - X^2)^{1/2}.$$

wherein the coordinates of the first point of the curve $X_o$ complies with the relation:

$$X_o \leq R_o^2 R^{-1} \text{ or } \frac{R_o^2}{R}$$

What is claimed is:

1. An electromagnetic pick-up device for measuring the volume throughflow of a thickened highly abrasive suspension comprising: at least one pair of pick-up electrodes, made of electrically conductive material, which are integrally incorporated in a lining of electrically non-conductive material and which are excited by an exciting magnetic field, the improvement wherein; the pick-up electrodes are located at a distance of about 0.3 to 0.8 of the initial internal radius $R_o$ of the lining or of a measuring tube from a plane perpendicular to the direction of the exciting magnetic field, the plane passing through the center of the lining or of the measuring tube, and the electrodes having the shape of a curve the coordinates X, Y of which are determined by the relation:

$$Y = (X \cdot R_o^2 \cdot X_o^{-1} - X^2)^{\frac{1}{2}}$$

wherein the coordinates of the first point of the curve $X_o$ complies with the relation:
$$X_o \leq R_o^2 \cdot R^{-1}$$

where R is the external radius of the lining or of the measuring tube.

2. An electromagnetic pick-up device as claimed in claim 1 wherein the material of the electrically non-conductive lining or of the measuring tube has substantially the same resistivity against abrasion as the electrically conductive material of the pick-up electrodes, with there being a maximum difference of 3%.

* * * * *